United States Patent
Chen et al.

(10) Patent No.: US 12,418,261 B2
(45) Date of Patent: Sep. 16, 2025

(54) METHOD FOR VISUAL INSPECTION OF PHOTOVOLTAIC MODULE

(71) Applicants: ZHEJIANG JINKO SOLAR CO., LTD., Zhejiang (CN); JINKO SOLAR CO., LTD., Jiangxi (CN)

(72) Inventors: Zhendong Chen, Zhejiang (CN); Luchuang Wang, Zhejiang (CN); Wusong Tao, Zhejiang (CN)

(73) Assignees: ZHEJIANG JINKO SOLAR CO., LTD., Zhejiang (CN); JINKO SOLAR CO., LTD., Jiangxi (CN)

( * ) Notice: Subject to any disclaimer, the term of this patent is extended or adjusted under 35 U.S.C. 154(b) by 409 days.

(21) Appl. No.: 18/071,912

(22) Filed: Nov. 30, 2022

(65) Prior Publication Data
US 2024/0039472 A1    Feb. 1, 2024

(30) Foreign Application Priority Data

Jul. 28, 2022    (CN) .......................... 202210901541.6

(51) Int. Cl.
*H02S 50/10*    (2014.01)

(52) U.S. Cl.
CPC .................... *H02S 50/10* (2014.12)

(58) Field of Classification Search
CPC ...... G01N 29/069; G01N 21/88; G01N 21/95; G06T 7/0002; G06T 7/0004; H02S 50/10; H02S 50/15; Y02E 10/50
See application file for complete search history.

(56) References Cited

U.S. PATENT DOCUMENTS

| | | | |
|---|---|---|---|
| 2018/0013025 A1* | 1/2018 | Iwata | H10F 77/48 |
| 2022/0099593 A1* | 3/2022 | Sweetnam | G01N 21/9501 |
| 2024/0039472 A1 | 2/2024 | Chen et al. | |

FOREIGN PATENT DOCUMENTS

| | | |
|---|---|---|
| CN | 107068789 | 8/2017 |
| CN | 107408598 | 11/2017 |
| CN | 207690809 | 8/2018 |

(Continued)

OTHER PUBLICATIONS

Extended European Search Report issued in corresponding EP Application 22210720.3, issued Aug. 11, 2023, 6 pages.
(Continued)

*Primary Examiner* — Matthew C Bella
*Assistant Examiner* — Janice E. Vaz
(74) *Attorney, Agent, or Firm* — Burris Law, PLLC

(57) ABSTRACT

A method for visual inspection of a photovoltaic module, including: turning on a first light source located above the photovoltaic module, and recording, by an image collector, first coordinates and second coordinates of edge intersections at ends of the film strips; turning on a second light source located below the photovoltaic module, and recording, by the image collector, third coordinates and fourth coordinates of overlapping points among edges of the solar cells, the ends of the film strips, and the cell gaps or the string gaps; and analyzing, by the image collector, differences between the first coordinates and the third coordinates and between the second coordinates and the fourth coordinates along width directions of the cell gaps or the string gaps, wherein the differences are overlap spacings between the film strips and the solar cells.

20 Claims, 3 Drawing Sheets

(56) References Cited

FOREIGN PATENT DOCUMENTS

| | | | |
|---|---|---|---|
| CN | 207753021 | | 8/2018 |
| CN | 108780822 | | 11/2018 |
| CN | 110112247 | | 8/2019 |
| CN | 209389047 | | 9/2019 |
| CN | 210110805 | | 2/2020 |
| CN | 111370516 | | 7/2020 |
| CN | 114597278 | | 6/2022 |
| CN | 114627041 | | 6/2022 |
| EP | 4312364 | | 1/2024 |
| JP | 2003186016 | | 7/2003 |
| KR | 101568131 | B1 * | 11/2015 |
| WO | 2011013444 | A1 | 2/2011 |

OTHER PUBLICATIONS

Yin et al., ESPI Solution for Defect Detection in Crystalline Photovoltaic Cells, Seventh International Symposium on Precision Engineering Measurements and Instrumentation, Proc. of SPIE, pp. 832139-1 to 0832139-6, vol. 8321, 2011.
Chinese Office Action mailed Mar. 12, 2025, issued in related Chinese Application No. 202210901541.6, 14 pages.

* cited by examiner

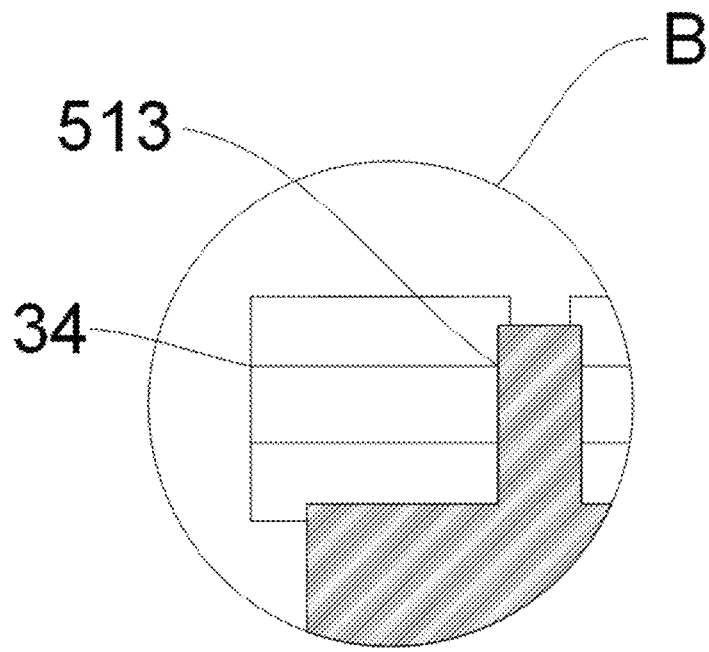

FIG. 5

| Placing a photovoltaic back sheet of a photovoltaic module upwards on a worktable, turning on a first light source located above the photovoltaic module, and recording by an image collector first edge position information of film strips in width directions | — S40 |

↓

| Identifying by the image collector positions of solder strips through the film strips and then obtaining second edge position information of solar cells | — S50 |

↓

| Analyzing by the image collector the first edge position information and the second edge position information to obtain a difference therebetween in a horizontal direction, the difference is the overlap spacings between the film strips and the solar cells | — S60 |

FIG. 6

METHOD FOR VISUAL INSPECTION OF PHOTOVOLTAIC MODULE

CROSS-REFERENCE TO RELATED APPLICATIONS

This application claims priority to and the benefit of Chinese Patent Application No. 202210901541.6, filed Jul. 28, 2022. The disclosure of the above application is incorporated herein by reference in its entirety.

FIELD

The present disclosure relates to the technical field of photovoltaic inspection, and in particular, to a method for visual inspection of a photovoltaic module.

BACKGROUND

The statements in this section merely provide background information related to the present disclosure and may not constitute prior art.

In recent years, researchers have focused on efficient conversion of solar energy to electric energy based on photovoltaic effect. At present, in order to make full use of an effective area in a photovoltaic module, researchers have done detailed analysis and research on a non-solar-cell region in the photovoltaic module, and found that light incident on gaps between solar cells in the photovoltaic module mostly undergoes regular reflection, and is reflected outside the module or through the module to the ground. Gaps between the solar cells and between solar cell strings essentially occupy part of a surface area of the photovoltaic module, and the gaps cannot participate in energy conversion, so that sunlight received by the part of the surface area is wasted, resulting in reduction of photoelectric conversion efficiency of the photovoltaic module.

In order to solve the problem, reflective film strips may be attached to the photovoltaic back sheet to be arranged opposite to the gaps between the solar cells and between the solar cell strings. In the related art, there are mainly two film-applying designs for a gap film-applying assembly: one is that lengths of film strips between all strings/cells can completely cover an entire string/cell gap; the other is that the lengths of the film strips between the cells are complete, and the film strips between the strings are all arranged in a form of being shorter than half of the solar cells. In the two design manners, widths of overlapping parts between the solar cells and the film strips cannot be observed at any point through conventional visual identification, which easily causes a problem of excessively small overlap spacings between the film strips and the solar cells or light leakage, reducing a lamination yield of the photovoltaic module.

SUMMARY

This section provides a general summary of the disclosure and is not a comprehensive disclosure of its full scope or all of its features.

In view of the above, the present disclosure provides a method for visual inspection of a photovoltaic module, through the shortening of two ends of film strips opposite to cell gaps between solar cells or string gaps between solar cell strings and configurations of a first light source arranged above the worktable and a second light source arranged below the worktable, a photovoltaic module with light leakage caused by small overlap spacings therebetween or incomplete covering of the cell gaps or the string gaps by two sides of the film strips can be selected for repair, thereby increasing the lamination yield of the photovoltaic module.

In a first aspect, the present disclosure provides a method for visual inspection of a photovoltaic module. The photovoltaic module includes a plurality of sets of solar cell strings and a plurality of film strips, the sets of solar cell strings each include a plurality of solar cells, the film strips are arranged opposite to cell gaps formed between the solar cells or string gaps formed between the solar cell strings, and lengths of the film strips are less than lengths of the cell gaps or the string gaps. The method includes the following steps: turning on a first light source located above the photovoltaic module, and recording, by an image collector, first coordinates and second coordinates of edge intersections at ends of the film strips; turning on a second light source located below the photovoltaic module, and recording, by the image collector, third coordinates and fourth coordinates of overlapping points among edges of the solar cells, the ends of the film strips, and the cell gaps or the string gaps; and analyzing, by the image collector, differences between the first coordinates and the third coordinates and between the second coordinates and the fourth coordinates along width directions of the cell gaps or the string gaps, wherein the differences are overlap spacings between the film strips and the solar cells.

In one or more embodiments, vertical distances between the first light source and the film strips range from 50 mm to 500 mm.

In one or more embodiments, light-emitting intensity of the first light source ranges from 1000 Lm to 20000 Lm.

In one or more embodiments, vertical distances between the second light source and the solar cells range from 1 mm to 200 mm.

In one or more embodiments, light-emitting intensity of the second light source ranges from 1000 Lm to 20000 Lm.

In one or more embodiments, lengths of ends of the cell gaps or the string gaps not covered by the film strips range from 0.5 mm to 200 mm.

In one or more embodiments, vertical distances between the image collector and the solar cells range from 100 mm to 600 mm.

In one or more embodiments, the photovoltaic module includes a photovoltaic back sheet provided with a plurality of film strips, and the film strips are arranged opposite to cell gaps formed between the solar cells or string gaps formed between the solar cell strings, widths of the film strips are greater than widths of the cell gaps or the string gaps, and along length directions of the cell gaps or the string gaps, at least part of two ends of the film strips does not cover the cell gaps or the string gaps.

In one or more embodiments, ratios of widths of the film strips and the cell gaps or the string gaps range from 2.5:1 to 3.5:1.

In one or more embodiments, along the width directions of the cell gaps or the string gaps, overlap spacings between the film strips and the solar cells range from 0.01 mm to 10 mm.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 5 is a schematic enlarged view of B in FIG. 2; and

FIG. 6 is a flow chart of a visual inspection method according to one or more embodiments of the present disclosure.

Figure 1:
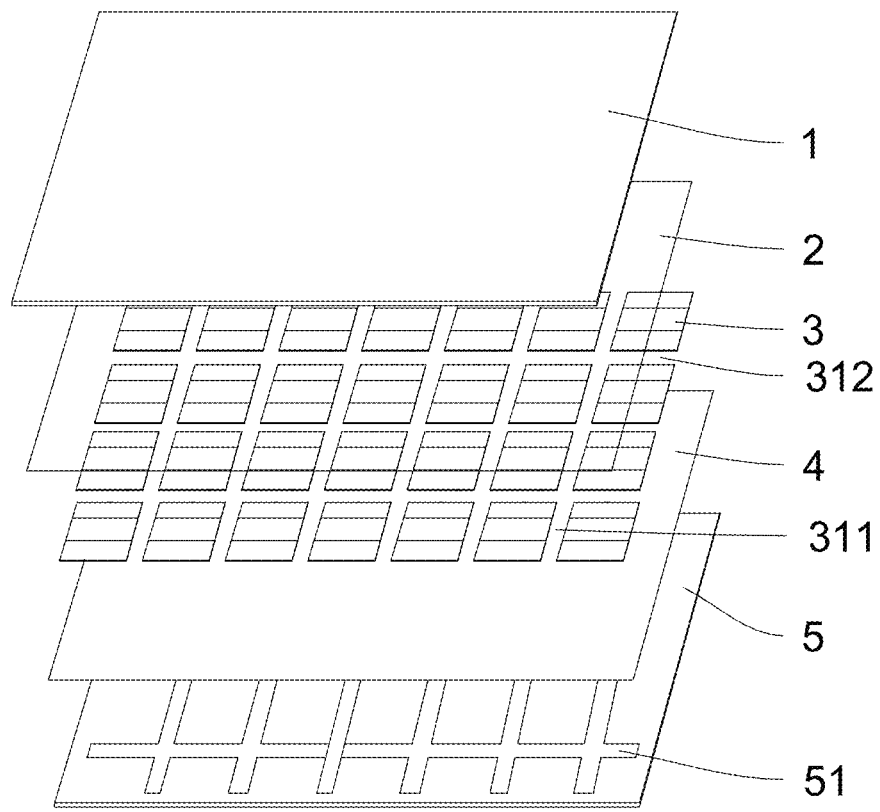
FIG. 1 is a schematic structural diagram of a photovoltaic module according to one or more embodiments of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In order to better understand the technical solutions of the present disclosure, the embodiments of the present disclosure will be described in detail below with reference to the accompanying drawings.

It should be made clear that the described embodiments are merely some of rather than all of the embodiments of the present disclosure. All other embodiments acquired by those of ordinary skill in the art without creative efforts based on the embodiments in the present disclosure fall within the protection scope of the present disclosure.

The terms used in the embodiments of the present disclosure are for the purpose of describing particular embodiments only, and are not intended to limit the present disclosure. As used in the embodiments of the present disclosure and the appended claims, the singular forms of "a/an", "the", and "said" are also intended to include plural forms, unless otherwise clearly specified in the context.

It should be understood that the term "and/or" used herein is merely an association relationship describing associated objects, indicating that three relationships may exist. For example, A and/or B indicates that there are three cases of A alone, A and B together, and B alone. In addition, the character "/" generally indicates an "or" relationship between the associated objects.

In recent years, researchers have focused on efficient conversion of solar energy to electric energy based on photovoltaic effect. At present, in order to make full use of an effective area in a photovoltaic module, researchers have done detailed analysis and research on a non-solar-cell region in the photovoltaic module, and found that light incident on gaps between solar cells in the photovoltaic module mostly undergoes regular reflection, and is reflected outside the module or through the module to the ground. Gaps between the solar cells and between solar cell strings essentially occupy part of a surface area of the photovoltaic module, and the gaps cannot participate in energy conversion, so that sunlight received by the part of the surface area is wasted, resulting in reduction of photoelectric conversion efficiency of the photovoltaic module.

In order to solve the problem, reflective film strips can be attached to the photovoltaic back sheet to be arranged opposite to the gaps between the solar cells and between the solar cell strings. In the related art, there are mainly two kinds of film-applying design for a gap film-applying assembly: one is that lengths of film strips between all strings/cells can completely cover an entire string/cell gap; the other is that the lengths of the film strips between the cells are complete, and the film strips between the strings are all provided shorter than half of the solar cells. In the two design manners, widths of overlapping parts between the solar cells and the film strips cannot be observed at any point through conventional visual identification, which easily causes the problem of excessively small overlap spacing between the film strips and the solar cells or light leakage, reducing the lamination yield of the photovoltaic module.

In view of the above, the present disclosure provides a method for visual inspection of a photovoltaic module. FIG. 1 is a schematic structural diagram of a photovoltaic module according to the present disclosure. As shown in FIG. 1, the photovoltaic module includes a plurality of solar cells 3 and a plurality of film strips 51. The film strips 51 are arranged opposite to cell gaps 311 formed between the solar cells 3 or string gaps 312 between solar cell strings, and lengths of the film strips 51 are less than lengths of the cell gaps 311 or the string gaps 312. The method includes the following steps.

A first light source located above the photovoltaic module is turned on, and an image collector records first coordinates 511 and second coordinates 512 of edge intersections at ends of the film strips 51.

A second light source located below the photovoltaic module is turned on, and the image collector records third coordinates 32 and fourth coordinates 33 of overlapping points among edges of the solar cells 3, the ends of the film strips 51, and the cell gaps 311 or the string gaps 312.

The image collector analyzes differences between the first coordinates 511 and the third coordinates 32 and between the second coordinates 512 and the fourth coordinates 33 along a width direction of the cell gaps 311 or the string gaps 312. The differences are overlap spacings between the film strips 51 and the solar cells 3.

In the above solution, according to the visual inspection method, the shortening of two ends of the film strips 51 opposite to the cell gaps 311 between the solar cells 3 or the string gaps 312 between the solar cell strings matches the first light source arranged above the worktable and a second light source arranged below the worktable. The image collector can collect coordinates of edge intersections at the ends of the film strips 51 and coordinates of overlapping points among edges of the solar cells 3, the ends of the film strips 51, and the cell gaps 311 or the string gaps 312, respectively. Stack spacings between the solar cells 3 and light-emitting film strips are then calculated, and a photovoltaic module with light leakage caused by small overlap spacings therebetween or incomplete covering of the gaps with two sides of the film strips 51 can be selected for repair, thereby increasing the lamination yield of the photovoltaic module.

In some embodiments, a photovoltaic module inspected with the visual inspection method includes photovoltaic glass 1, a first adhesive film 2, a plurality of sets of solar cell strings, a second adhesive film 4, and a photovoltaic back sheet 5. The solar cell strings each include a plurality of solar cells 3 arranged in series. The photovoltaic module is obtained by laminating the photovoltaic glass 1, the first adhesive film 2, the plurality of sets of solar cell strings, the second adhesive film 4, and the photovoltaic back sheet 5.

The plurality of sets of solar cell strings in the photovoltaic module are spaced apart from each other, and a string gap 312 is formed between adjacent solar cell strings. The solar cell strings each include a plurality of solar cells 3. Adjacent solar cells 3 are connected in series through a conductive connector (such as an electrode line or a solder strip). One end of the conductive connector is soldered with a rear electrode of one solar cell 3, and the other end of the conductive connector is soldered with a front electrode of another solar cell 3, so that a cell gap 311 is formed between the adjacent solar cells 3.

It is to be noted that the solar cells 3 used in the present disclosure may be single-sided photo-conversion solar cells or double-sided photo-conversion solar cells. The single-sided photo conversion solar cells refer to solar cells 3 that can receive light only from one side and convert the light into electric power. Double-sided solar cells 3 are solar cells 3 that can receive light from two sides and convert the light into electric power. That is, the solar cells 3 can receive direct sunlight from the front to convert the sunlight into electric power, and also receive, from the back, light such as reflected light or scattered light from the ground, thereby improving power generation efficiency of the photovoltaic module. Solar cells 3 in other photo conversion regions may also be feasible. The type of the solar cells 3 may be selected according to an actual requirement, which is not limited herein.

The solar cells 3 are fragile and prone to damages under pressure, and the photovoltaic glass 1 and the photovoltaic back sheet 5 shall not be directly attached thereto. Therefore, the first adhesive film 2 and the second adhesive film 4 are required to play a bonding role therebetween. In actual use, the first adhesive film 2 and the second adhesive film 4 are configured to wrap the solar cell strings spaced apart. The first adhesive film 2, the solar cell strings, and the second adhesive film 4 are laminated to obtain an assembly, and then the assembly is heated to a temperature so that the first adhesive film 2 and the second adhesive film 4 are melted and bonded with the solar cells 3.

It is to be noted that the first adhesive film 2 and the second adhesive film 4 used in the present disclosure may be ethylene vinyl acetate (EVA) adhesive films, polyolefin elastomer (POE) adhesive films, or polyethylene terephthalate (PET) adhesive films respectively, or other types of adhesive films, which may be selected according to an actual requirement and are not limited herein. In some embodiments, the first adhesive film 2 and the second adhesive film 4 used in the present disclosure are EVA adhesive films. The EVA adhesive films are non-adhesive at room temperature, have good flexibility, transparency, surface gloss, stable chemical properties, anti-aging, and good ozone resistance strength, which are non-toxic, and undergo melt bonding and cross-linking curing after hot pressing. The cured adhesive films have excellent light transmittance, bonding strength, thermal stability, air tightness, and aging resistance. When the plurality of sets of solar cell strings are wrapped, photo conversion performance of the photovoltaic module may not be affected.

The photovoltaic glass 1 is arranged on the side of the first adhesive film 2 away from the solar cells 3. The photovoltaic glass 1 is also called "photoelectric glass", and has good light transmission and high hardness, which, after covering the first adhesive film 2, can adapt to a large temperature difference between day and night and a bad weather environment, thereby protecting the solar cells 3. The photovoltaic glass 1 used in the present disclosure may be ultra-clear photovoltaic figured glass, ultra-clear machined float glass, or transparent conductive oxide (TCO) glass, and may also be other types of photovoltaic glass 1, which may be selected according to an actual requirement and is not limited herein.

The photovoltaic back sheet 5 is arranged on the side of the second adhesive film 4 away from the solar cells 3. The photovoltaic back sheet 5 also protect and support the solar cells 3, and has good weather resistance, water resistance, corrosion resistance, and insulation, which can isolate the photovoltaic module from surrounding photovoltaic environments, and effectively protect and support the solar cells 3, thereby improving resistance strength of the photovoltaic module. The photovoltaic back sheet 5 used in the present disclosure may be a double-sided fluorine film back sheet, a single-sided fluorine film back sheet, a fluorine-free back sheet, or the like, which may be selected according to an actual requirement and is not limited herein.

Figure 2:
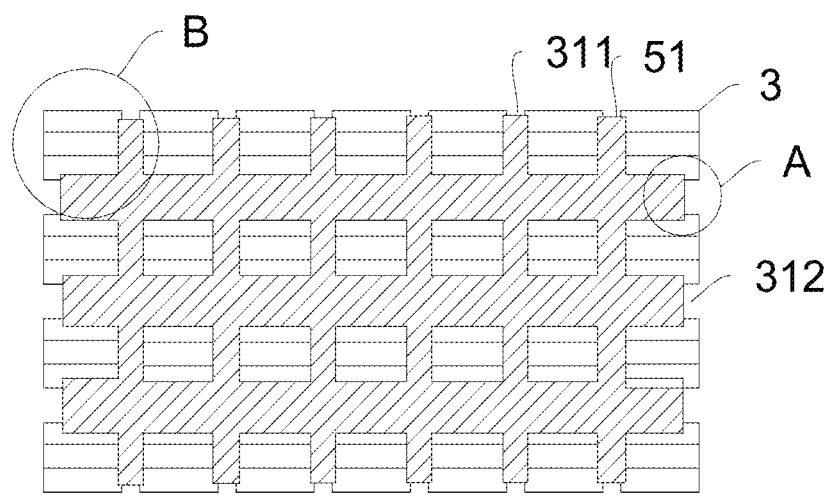
FIG. 2 is a schematic structural diagram showing film strips of the photovoltaic module covering cell gaps or string gaps according to one or more embodiments of the present disclosure.

In order to increase the utilization rate of the photovoltaic module to the sunlight, the photovoltaic back sheet 5 is further provided with a plurality of film strips 51. FIG. 2 is a schematic structural diagram showing film strips of the photovoltaic module covering cell gaps or string gaps according to one or more embodiments of the present disclosure. As shown in FIG. 2, the film strips 51 are arranged opposite to cell gaps 311 formed between the solar cells 3 or string gaps 312 formed between solar cell strings, which may be used to reflect the sunlight incident on the back sheet back to the solar cells 3. After the plurality of sets of solar cell strings are arranged, a plurality of cell gaps 311 arranged longitudinally are formed between the solar cells 3, a plurality of string gaps 312 arranged transversely are formed between the solar cell strings. Finally, the cell gaps 311 or the string gaps 312 of the photovoltaic module obtained upon completion of a lamination process are in shapes of grids. That is, the film strips 51 on the photovoltaic back sheet 5 are also in shapes of grids, so that the cell gaps 311 or the string gaps 312 can still participate in the conversion of solar energy.

Further, ratios of widths of the film strips 51 and the cell gaps 311 or the string gaps 312 are (2.5 to 3.5):1. In some embodiments, the ratios of widths of the film strips 51 and the cell gaps 311 or the string gaps 312 may be, for example, 2.5:1, 2.6:1, 2.7:1, 2.8:1, 2.9:1, 3.0:1, 3.1:1, 3.2:1, 3.3:1, 3.4:1, 3.5:1, or the like, and may also be other values in the range, which may be selected according to an actual requirement and are not limited herein. If the ratios of widths of the film strips 51 and the cell gaps 311 or the string gaps 312 are excessively small, that is, the film strips 51 cannot effectively cover an irradiation area of the sunlight through the cell gaps 311 or the string gaps 312, the utilization rate of the sunlight is low, and photo conversion efficiency of the photovoltaic module is low. If the ratios of widths of the film strips 51 and the cell gaps 311 or the string gaps 312 are excessively large, that is, the film strips 51 can cover a large area, the utilization rate of the sunlight is high, but manufacturing costs of the photovoltaic module significantly increase.

In actual use, the photovoltaic glass 1, the first adhesive film 2, the plurality of sets of solar cell strings, the second adhesive film 4, and the photovoltaic back sheet 5 are stacked and put into a laminating machine, air in the module is extracted by vacuuming, and then he first adhesive film 2 and the second adhesive film 4 are heated to melt to bond the solar cells, the glass, and the photovoltaic back sheet 5 together to obtain the photovoltaic module.

It is to be noted that, since the sunlight passes through the cell gaps 311 or the string gaps 312 from all directions, an area of the sunlight irradiating on the back sheet is greater than areas of the gaps. In order to make better use of the sunlight through the cell gaps 311 or the string gaps 312, the widths of the film strips 51 used in the present disclosure are greater than the widths of the cell gaps 311 or the string gaps 312 of the photovoltaic module. Thus, there is a need to detect overlap spacings between the film strips 51 and the solar cells 3 along width directions during the lamination, so as to select a photovoltaic module with light leakage caused by small overlap spacings therebetween or incomplete covering of the cell gaps 311 or the string gaps 312 with two sides of the film strips 51 for repair, thereby increasing the lamination yield of the photovoltaic module.

Further, to enable the visual detection process to operate normally, lengths of the film strips 51 used in the present disclosure are less than lengths of the cell gaps 311 or the string gaps 312 of the photovoltaic module. That is, at least part of two ends of the film strips 51 do not cover the cell gaps 311 or the string gaps 312. During use, the film strips 51 cover the cell gaps 311 or the string gaps 312 in shapes of grids of the photovoltaic module along width directions, and the two ends of the film strips 51 along length directions do not completely cover the cell gaps 311 or the string gaps 312 in shapes of grids. That is, finally, a side length of a grid structure formed by the film strips 51 is less than a side length of a grid structure formed by the cell gaps 311 or the string gaps 312 of the photovoltaic module.

Figure 3:
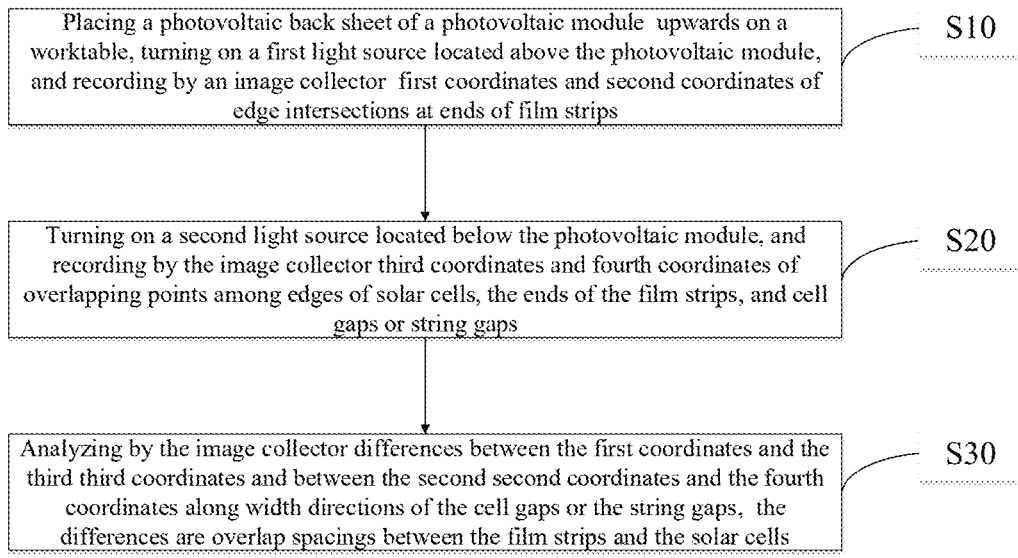
FIG. 3 is a flowchart of a visual inspection method according to one or more embodiments of the present disclosure.

FIG. 3 is a flowchart of a visual inspection method according to one or more embodiments of the present disclosure. As shown in FIG. 3, the visual inspection method includes the following steps.

In step S10, a photovoltaic back sheet 5 of a photovoltaic module is placed upwards on a worktable, a first light source located above the photovoltaic module is turned on, and an image collector records first coordinates 511 and second coordinates 512 of edge intersections at ends of film strips 51.

In step S20, a second light source located below the photovoltaic module is turned on, and the image collector (CMOS) records third coordinates 32 and fourth coordinates 33 of overlapping points among edges of solar cells 3, the ends of the film strips 51, and cell gaps 311 or string gaps 312.

In step S30, the image collector analyzes differences between the first coordinates 511 and the third coordinates 32 and between the second coordinates 512 and the fourth coordinates 33 along width directions of the cell gaps 311 or the string gaps 312, the differences are overlap spacings between the film strips 51 and the solar cells 3.

Figure 4:
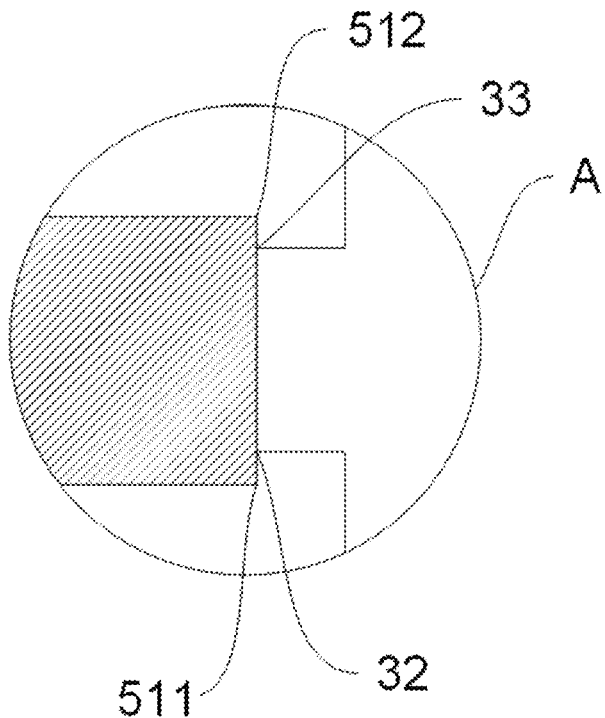
FIG. 4 is a schematic enlarged view of A in FIG. 2.

In step S10, the photovoltaic back sheet 5 of the photovoltaic module is facing upwards. That is, during the inspection, FIG. 4 is a schematic enlarged view of A in FIG. 2. As shown in FIG. 4, the film strips 51 are located above the solar cells 3. When the first light source above the worktable is turned on, the first light source may display end edges of the film strips 51 along the width directions. During the irradiation, vertical distances between the first light source and the film strips 51 range from 50 mm to 500 mm, and light-emitting intensity of the first light source ranges from 1000 Lm to 20000 Lm. In some embodiments, the vertical distances between the first light source and the film strips 51 may be, for example, 50 mm, 100 mm, 150 mm, 200 mm, 250 mm, 300 mm, 350 mm, 400 mm, 450 mm, 500 mm, or the like, and the light-emitting intensity of the first light source may be, for example, 1000 Lm, 3000 Lm, 5000 Lm, 7000 Lm, 9000 Lm, 11000 Lm, 13000 Lm, 15000 Lm, 17000 Lm, 20000 Lm, or the like, which may also be other values in the ranges, may be selected according to an actual requirement, and are not limited herein. If the vertical distances between the first light source and the film strips 51 are excessively small or the light-emitting intensity of the first light source is excessively large, brightness on the film strips 51 is excessively high. Moreover, during the irradiation, the light easily penetrates the film strips 51 and irradiates on the solar cells 3, causing the edges of the film strips 51 to overlap with the solar cells 3, affecting an acquisition process of the image collector for first coordinates 511 and second coordinates 512 of the edge intersections at the ends of the film strips 51. If the vertical distances between the first light source and the film strips 51 are excessively large or the light-emitting intensity of the first light source is excessively small, brightness on the film strips 51 is excessively low, the edges of the film strips 51 are not obvious, and the image collector cannot collect correct first coordinates 511 and second coordinates 512 of the edge intersections at the ends of the film strips 51.

In step S20, when the second light source below the worktable is turned on, the second light source may illuminate edges of the solar cells 3. During the irradiation, vertical distances between the second light source and the solar cells 3 range from 1 mm to 200 mm, and light-emitting intensity of the second light source ranges from 1000 Lm to 20000 Lm. In some embodiments, the vertical distances between the second light source and the solar cells 3 may be, for example, 1 mm, 20 mm, 40 mm, 60 mm, 80 mm, 100 mm, 120 mm, 140 mm, 160 mm, 180 mm, 200 mm, or the like, and the light-emitting intensity of the second light source may be, for example, 1000 Lm, 3000 Lm, 5000 Lm, 7000 Lm, 9000 Lm, 12000 Lm, 14000 Lm, 16000 Lm, 18000 Lm, 20000 Lm, or the like, which may also be other values in the ranges, may be selected according to an actual requirement, and are not limited herein. If the vertical distances between the second light source and the solar cells 3 are excessively small or the light-emitting intensity of the second light source is excessively large, brightness on the solar cells 3 is excessively high, and light irradiates on the image collector after passing through the cell gaps 311 or the string gaps 312, which affects a position acquisition process of the image collector and leads to incorrect collection results of third coordinates 32 and fourth coordinates 33 of overlapping points among edges of the solar cells 3, the ends of the film strips 51, and the cell gaps 311 or the string gaps 312. If the vertical distances between the second light source and the solar cells 3 are excessively large or the light-emitting intensity of the second light source is excessively small, the brightness on the solar cells 3 is excessively low, the edges of the solar cells 3 are not obvious, and the image collector cannot collect correct third coordinates 32 and fourth coordinates 33 of overlapping points among the edges of the solar cells 3, the ends of the film strips 51, and the cell gaps 311 or the string gaps 312.

In step S30, the image collector analyzes differences between the first coordinates 511 and the third coordinates 32 and between the second coordinates 512 and the fourth coordinates 33 along width directions of the cell gaps 311 or the string gaps 312.

In the photovoltaic module with lamination yield meets the production requirement, along the width directions of the cell gaps 311 or the string gaps 312, overlap spacings between the film strips 51 and the solar cells 3 range from 0.01 mm to 10 mm. In some embodiments, the overlap spacings between the film strips 51 and the solar cells 3 may be, for example, 0.01 mm, 1 mm, 2 mm, 3 mm, 4 mm, 5 mm, 6 mm, 7 mm, 8 mm, 9 mm, 10 mm, or the like, which may also be other values in the ranges, may be selected according to an actual requirement, and are not limited herein. If the overlap spacings between the film strips 51 and the solar cells 3 are excessively large, the utilization rate of the sunlight is high, but manufacturing costs of the photovoltaic module significantly increase. If the overlap spacings between the film strips 51 and the solar cells 3 are excessively small, the utilization rate of the sunlight is low, and photo conversion efficiency of the photovoltaic module is low.

According to the visual inspection method, the shortening of two ends of the film strips 51 opposite to the cell gaps 311 or the string gaps 312 matches a first light source arranged above the worktable and a second light source arranged below the worktable, the image collector can collect coordinates of edge intersections at the ends of the film strips 51 and coordinates of overlapping points among edges of the solar cells 3, the ends of the film strips 51, and the cell gaps 311 or the string gaps 312 respectively, and stack spacings between the solar cells 3 and light-emitting film strips are then calculated. In another optional technical solution, according to the visual inspection method according to the present disclosure, the edges of the solar cells 3 can also be positioned by visual identification on solder strips between the solar cells 3. That is, there is no need to use the second light source below the worktable.

FIG. 5 is a schematic enlarged view of B in FIG. 2. As shown in FIG. 5, during serial soldering of the solar cells 3, centers of a busbar of the photovoltaic module, the solder strips between the solar cells 3, and the film strips 51 overlap, and positions of the solder strips can be clearly observed through the film strips 51. Moreover, since an overall size of the solar cells 3 is a fixed value, such as lengths and widths of the solar cells 3, a position of the busbar, and widths of the solder strips, edge position information of the solar cells 3 can be calculated after edges of the solder strips are identified with the visual inspection method and then compared with edge position information of the film strips 51, and the overlap spacings between the film strips 51 and the solar cells 3 can be obtained. An identification process includes the following steps as shown in FIG. 6.

In step S40, a photovoltaic back sheet 5 of a photovoltaic module is placed upwards on a worktable, a first light source located above the photovoltaic module is turned on, and an image collector records first edge position information 513 of film strips 51 in width directions.

In step S50, the image collector identifies positions of solder strips through the film strips 51 and then obtains second edge position information 34 of solar cells 3.

In step S60, the image collector analyzes the first edge position information 513 and the second edge position information 34 to obtain a difference therebetween in a horizontal direction. The difference is the overlap spacings between the film strips 51 and the solar cells 3.

For example, in step S50, spacings between a center line of an outermost busbar of the photovoltaic module to edges of the solar cells 3 are 10 mm, a width of a solder strip whose center overlaps with a center of the busbar is 0.26 mm, and distances between edges of the solder strips and the edges of the solar cells 3 are 10-0.26/2=9.87 mm. Then, position information of the solder strips is identified through the image collector, and the edges of the solar cells 3 are 9.87 mm from the edges of the solder strips.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for visual inspection of a photovoltaic module, wherein the photovoltaic module comprises a plurality of sets of solar cell strings and a plurality of film strips, the sets of solar cell strings each comprise a plurality of solar cells, the film strips are arranged opposite to cell gaps formed between the solar cells or string gaps formed between the solar cell strings, and lengths of the film strips are less than lengths of the cell gaps or the string gaps,
the method comprises:
turning on a first light source located above the photovoltaic module, and recording, by an image collector, first coordinates and second coordinates of edge intersections at ends of the film strips;
turning on a second light source located below the photovoltaic module, and recording, by the image collector, third coordinates and fourth coordinates of overlapping points among edges of the solar cells, the ends of the film strips, and the cell gaps or the string gaps; and
analyzing, by the image collector, differences between the first coordinates and the third coordinates and between the second coordinates and the fourth coordinates along width directions of the cell gaps or the string gaps, wherein the differences are overlap spacings between the film strips and the solar cells.

2. The method according to claim 1, wherein vertical distances between the first light source and the film strips range from 50 mm to 500 mm.

3. The method according to claim 1, wherein light-emitting intensity of at least one of the first light source or the second light source ranges from 1000 Lm to 20000 Lm.

4. The method according to claim 1, wherein vertical distances between the second light source and the solar cells range from 1 mm to 200 mm.

5. The method according to claim 1, wherein lengths of ends of the cell gaps or the string gaps not covered by the film strips range from 0.5 mm to 200 mm.

6. The method according to claim 1, wherein vertical distances between the image collector and the solar cells range from 100 mm to 600 mm.

7. The method according to claim 1, wherein the photovoltaic module comprises a photovoltaic back sheet provided with a plurality of film strips, and the film strips are arranged opposite to cell gaps formed between the solar cells or string gaps formed between the solar cell strings, widths of the film strips are greater than widths of the cell gaps or the string gaps, and along length directions of the cell gaps or the string gaps, at least part of two ends of the film strips does not cover the cell gaps or the string gaps.

8. The method according to claim 7, wherein ratios of widths of the film strips and the cell gaps or the string gaps range from 2.5:1 to 3.5:1.

9. The method according to claim 7, wherein, along the width directions of the cell gaps or the string gaps, overlap spacings between the film strips and the solar cells range from 0.01 mm to 10 mm.

10. The method according to claim 1, further comprising:
selecting, based on the analyzing result, defective photovoltaic module with light leakage caused by small overlap spacings therebetween or incomplete covering of the cell gaps or the string gaps with two sides of the film strips for repair.

11. A method for visual inspection of a photovoltaic module, wherein the photovoltaic module comprises a plurality of sets of solar cell strings and a plurality of film strips, the sets of solar cell strings each comprise a plurality of solar cells, the film strips are arranged opposite to cell gaps formed between the solar cells or string gaps formed between the solar cell strings, and lengths of the film strips are less than lengths of the cell gaps or the string gaps,
the method comprises:
placing a photovoltaic back sheet upwards on a worktable, turning on a first light source located above the photovoltaic module, and recording, by an image collector, first edge position information of the film strips in width directions;
identifying, by the image collector, positions of solder strips through the film strips and obtaining second edge position information of the solar cells;
analyzing, by the image collector, the first edge position information and the second edge position information to obtain differences therebetween in a horizontal direction,
wherein the differences are overlap spacings between the film strips and the solar cells.

12. The method according to claim 11, wherein vertical distances between the first light source and the film strips range from 50 mm to 500 mm.

13. The method according to claim 11, wherein light-emitting intensity of at least one of the first light source or the second light source ranges from 1000 Lm to 20000 Lm.

14. The method according to claim 11, wherein vertical distances between the second light source and the solar cells range from 1 mm to 200 mm.

15. The method according to claim 11, wherein lengths of ends of the cell gaps or the string gaps not covered by the film strips range from 0.5 mm to 200 mm.

16. The method according to claim 11, wherein vertical distances between the image collector and the solar cells range from 100 mm to 600 mm.

17. The method according to claim 11, wherein the photovoltaic module comprises a photovoltaic back sheet provided with a plurality of film strips, and the film strips are arranged opposite to cell gaps formed between the solar cells or string gaps formed between the solar cell strings, widths of the film strips are greater than widths of the cell gaps or the string gaps, and along length directions of the cell gaps or the string gaps, at least part of two ends of the film strips does not cover the cell gaps or the string gaps.

18. The method according to claim 17, wherein ratios of widths of the film strips and the cell gaps or the string gaps range from 2.5:1 to 3.5:1.

19. The method according to claim 17, wherein, along the width directions of the cell gaps or the string gaps, overlap spacings between the film strips and the solar cells range from 0.01 mm to 10 mm.

20. The method according to claim 11, further comprising:
selecting, based on the analyzing result, defective photovoltaic module with light leakage caused by small overlap spacings therebetween or incomplete covering of the cell gaps or the string gaps with two sides of the film strips for repair.

* * * * *